United States Patent
Herberth

(10) Patent No.: US 7,500,106 B2
(45) Date of Patent: Mar. 3, 2009

(54) METHOD FOR IDENTIFYING, AUTHENTICATING AND AUTHORIZING A USER OF PROTECTED DATA

(75) Inventor: Harald Herberth, Oberasbach (DE)

(73) Assignee: Siemens Aktiengesellschaft, Munich (DE)

( * ) Notice: Subject to any disclaimer, the term of this patent is extended or adjusted under 35 U.S.C. 154(b) by 855 days.

(21) Appl. No.: 10/972,251

(22) Filed: Oct. 22, 2004

(65) Prior Publication Data
US 2005/0091509 A1    Apr. 28, 2005

(30) Foreign Application Priority Data
Oct. 27, 2003    (EP)    ................... 03024561

(51) Int. Cl.
| G06F 7/04 | (2006.01) |
| G06F 17/30 | (2006.01) |
| G06F 17/40 | (2006.01) |
| H04L 9/32 | (2006.01) |
| G06F 12/14 | (2006.01) |
| G11C 7/00 | (2006.01) |

(52) U.S. Cl. ........................ 713/184; 713/165; 713/168; 713/179; 713/181; 726/7; 726/19; 726/28

(58) Field of Classification Search ................. 713/165, 713/168, 179, 181, 184; 726/7, 19, 28
See application file for complete search history.

(56) References Cited

U.S. PATENT DOCUMENTS

| 4,918,588 | A | * | 4/1990 | Barrett et al. ................. 707/10 |
| 6,141,760 | A | * | 10/2000 | Abadi et al. ................... 726/14 |
| 6,230,269 | B1 | * | 5/2001 | Spies et al. .................. 713/182 |
| 7,024,690 | B1 | * | 4/2006 | Young et al. .................... 726/5 |
| 7,194,625 | B2 | * | 3/2007 | Cormack et al. ............ 713/168 |
| 7,421,735 | B2 | * | 9/2008 | Kerstens et al. ............... 726/12 |
| 2003/0005118 | A1 | * | 1/2003 | Williams ..................... 709/225 |
| 2003/0033545 | A1 | * | 2/2003 | Wenisch et al. ............. 713/202 |
| 2003/0046572 | A1 | * | 3/2003 | Newman et al. ............ 713/193 |
| 2003/0163737 | A1 | * | 8/2003 | Roskind ...................... 713/201 |
| 2003/0177385 | A1 | * | 9/2003 | Price et al. ................... 713/201 |
| 2004/0162996 | A1 | * | 8/2004 | Wallace et al. .............. 713/201 |

OTHER PUBLICATIONS

Sandhu, Ravi et al. "Access Control: Principles and Practice", 1994.*
Feldmeier, David C. et al. "UNIX Password Security—Ten Years Later", 1989.*

* cited by examiner

*Primary Examiner*—Michael J Simitoski

(57) ABSTRACT

A method for identifying, authenticating and authorizing a user of protected data, in particular a use of protected in an automation system, whereby the user is identified by the user ID input by them in an input field in a login area, this input user ID is combined with a password input by the user and transferred with a one-way encryption function to a system ID which authenticates the user, at least this system ID is transferred in an access identifier from the login area to a protected area and the user is authorized by this transferred access identifier to obtain access to protected data in the protected area.

3 Claims, 1 Drawing Sheet

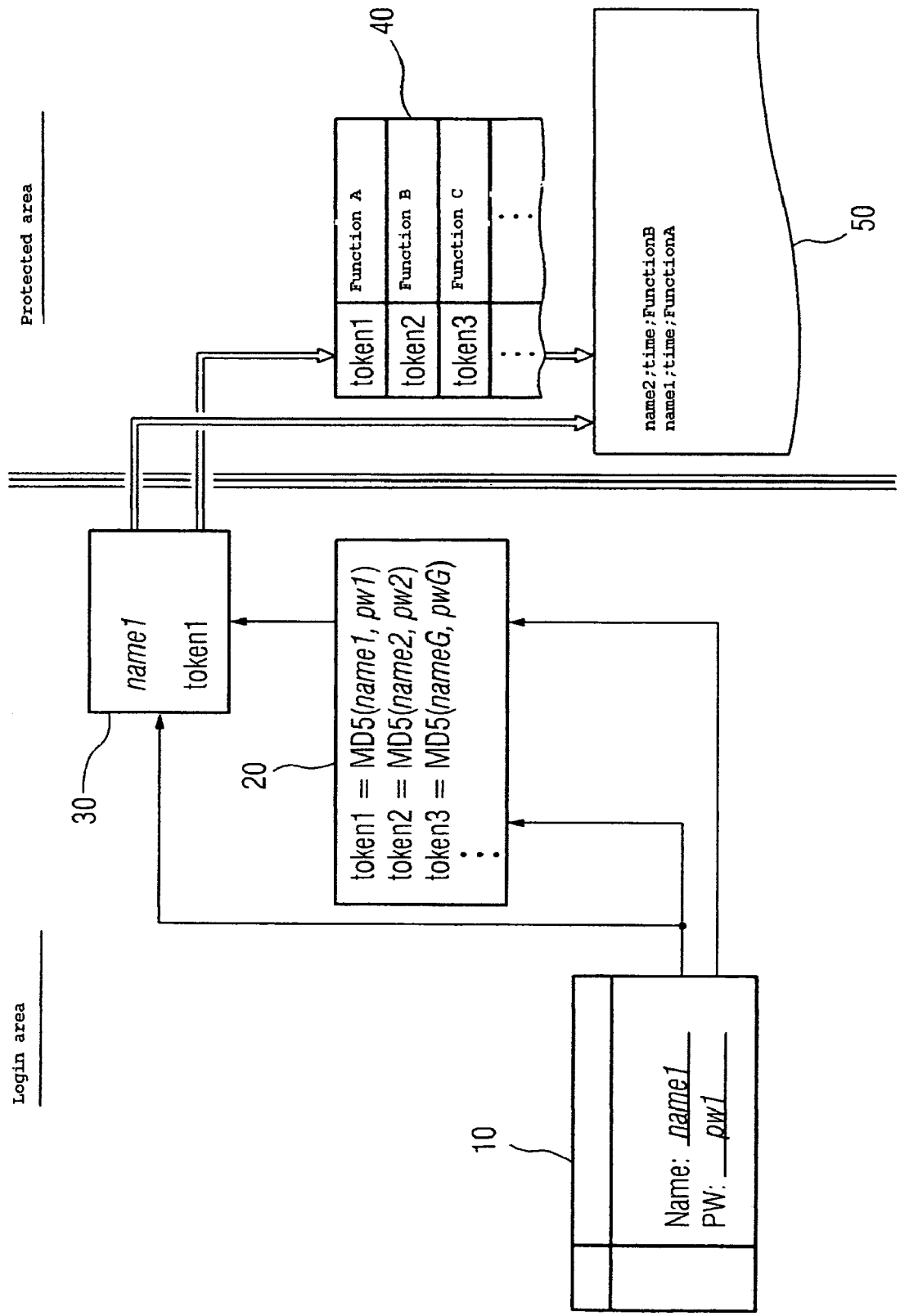

METHOD FOR IDENTIFYING, AUTHENTICATING AND AUTHORIZING A USER OF PROTECTED DATA

CROSS REFERENCE TO RELATED APPLICATIONS

This application claims priority to the European application No. 03024561.7, filed Oct. 27, 2003 and which is incorporated by reference herein in its entirety.

FIELD OF INVENTION

The present invention relates to a method for identifying, authenticating and authorizing a user of protected data, in particular a user of protected data in an automation system.

BACKGROUND OF INVENTION

It is becoming increasingly important in many technical fields, in particular with automation systems, that data, e.g. system data, program data, system functions or other protected information, present in a protected area can only be accessed by previously identified, authenticated and authorized users.

Methods for authenticating users are used widely today. For example a user is authenticated by a password input by said user in an input field of a login area. If the user inputs a valid password, said user is authenticated and obtains access to the information present in the protected area. To transfer the password from the login area to the protected area the password is encrypted using corresponding algorithms, e.g. the encryption algorithm known as MD5, and transferred to the protected area as a so-called access identifier. However it is no longer possible or only possible with great difficulty to identify the user and log their access where necessary in the protected area with this password that has now been encrypted and transferred in the access identifier. It is therefore generally no longer possible in the protected area to track who exactly has accessed the information and data present in the protected area.

SUMMARY OF INVENTION

So that it can also be ascertained in the protected area who and if necessary when a user has accessed the protected data, corresponding methods have to be provided for identifying the user. The user can for example be required to input a user ID assigned to them in the input field in the login area as well as the password. This user ID and the password are then compared with the permitted combinations of user ID and password stored in a user management database. If the input user ID corresponds to one of the stored user IDs, the user is identified. If the input password also corresponds to one of the stored combinations, the user is also authenticated. The user ID and where necessary the encrypted password are then transferred to the protected area as access identifiers. The access entitlements associated with the permitted user IDs and passwords are stored in a database in the protected area. If there is an access entitlement associated with the transferred password and the transferred user ID in the database, the user obtains access to the corresponding protected data and information. Access can now also be logged in the protected area using the transferred user ID.

If data, such as system data, system functions or other important information, present in automation systems is to be protected, corresponding methods also have to be provided to allow the identification and authentication of users. If the aforementioned method is deployed in an automation system for simple authentication using an encrypted password, it is not possible in the protected area to log who has accessed said protected area. If the abovementioned method for identification using password and user ID is deployed, a high level of administrative outlay results due to the required user management databases in the login area and in the protected area. Where one or even a plurality of protected areas of the automation system are to be accessed from a plurality of user areas, this method requires a high level of outlay to administer the databases both in the user areas and in the different protected areas with the user IDs, passwords and permitted combinations thereof contained therein.

If the users of the automation system are to be authorized as well as identified and authenticated, the user management databases in the protected area have to be extended correspondingly. Links then also have to be stored in these user management databases indicating which user has access to which of the protected information or data using which user ID and which password. In particular where a plurality of different protected areas are present in an automation system, these access entitlements have to be administered with a corresponding outlay for all the user management databases of the different areas, which signifies a not inconsiderable additional outlay.

The object of the present invention is therefore to provide a method for identifying, authenticating and authorizing users of protected data, which avoids the disadvantages of high administration outlay described above, particularly for an automation system.

This object is achieved by the claims, wherein to identify, authenticate and authorize a user of protected data, in particular a user of protected data in an automation system the user is identified by the user ID input by them in an input field in a login area, this input user ID is combined with a password input by the user and transferred with a one-way encryption function to a system ID, which authenticates the user, at least this system ID is transferred in an access identifier from the login area to a protected area and the user is authorized by said transferred access identifier to obtain access to the protected data in the protected area.

As according to the invention the password is transferred together with the user ID with a one-way encryption function to a system ID, just one system ID is assigned to every user based on the password and user ID contained in the system ID. This system ID can therefore be used in the login area to identify the user uniquely and authenticate them. Also the user can be authorized in the protected area using the system ID transferred in the access identifier to have access to specific protected data and information. As this access entitlement at the same time mirrors the previously authenticated identity of the user, a user can be identified, authenticated and authorized without major administrative outlay with the inventive method. In particular in an automation system with a plurality of different protected areas, e.g. different control systems, or even with a plurality of login areas, e.g. different man-machine interfaces, extensive administration of the user data, such as password, user ID and their links is no longer necessary. Therefore project planning outlay for implementing such security functions for identification, authentication and authorization can be avoided, in particular in automation systems.

Although the present invention is limited to one-way encryption functions, any other function, which allows unique transfer of user ID and password to a system ID in a manner such that it cannot be computed back, should also be covered by the invention.

Further advantageous embodiments and preferred developments of the invention will emerge from the dependent claims.

The inventive method is described below using an example with reference to the accompanying Figure.

BRIEF DESCRIPTION OF THE DRAWING

The single Figure shows a preferred embodiment of the invention.

DETAILED DESCRIPTION OF INVENTION

The Figure shows two areas, namely a login area and a protected area. The login area should comprise all the necessary measures and steps, in particular the inputting of passwords and user IDs. Generally this login area is incorporated in a so-called man-machine interface, on which for example a user area for the automation system is mapped. The protected area on the other hand should comprise all data and functions, which are to be protected in a particular manner, in particular in an automation system. Thus in particular the data present in the automation system and having to be protected, such as system data, program data, objects, system functions and other important information, is stored in the protected area. The Figure only shows a schematic diagram of the division required for the present invention between the login area and the protected area. This division is not always clearly identifiable in an automation system in particular. Thus the protected area can for example comprise one or even a plurality of modules of the automation system present in the hardware, e.g. one or a plurality of control systems. On the other hand the protected area could also comprise a software module that can be downloaded onto a maintenance computer and contains information to be protected, such as control data for the automation system. In this case both the login area and the protected area would be present on the maintenance computer. On the other hand the login area could be activated from a plurality of different man-machine interfaces.

The login area shown in the FIGURE comprises an input field 10, into which a user has to input a password PW and a user ID NAME. Both the password PW and the user ID NAME are determined a priori for one or a plurality of users or even for an entire user group. Thus every user, who is to have access to the protected area, is allocated their own password, e.g. PW="pw1";"pw2"; . . . and their own user ID, e.g. NAME="name1";"name2"; . . . . On the other hand it is also possible for a shared password e.g. PW="pwG" or a shared user ID NAME="nameG" to be allocated to a group of users.

If a user, as shown in the figure, now inputs for example in the input field 10 the user ID NAME="name1" and the password PW="pw1", the user is identified using the input "name1". According to the invention however the input user ID "name1" is also transferred together with the input password "pw1" by means of a known one-way encryption function 20 to a system ID token1. The one-way encryption functions used for the inventive transfer of the password and user ID to the corresponding system ID are for example the MD5 or HMAC function known from cryptography. Both the MD5 and HMAC functions are thereby defined in so-called RFCs (Requests for Comment). These are in particular RFC 1321 for the MD5 (Message-Digest) algorithm and RFC 2104 for the HMAC (Keyed-Hashing for Message Authentication) algorithm. Thus in the present example the user ID "name1" and the password "pw1" are transferred using the MD5 algorithm to the system ID token1. In plain text this system ID generated using the MD5 algorithm could look like this: token 1=7071587f93a00d4b50f724ff683d1fd7. The system ID token1 thus generated thereby uniquely identifies a user, which means that the user with the name "name1" and the password "pw1" can be uniquely identified and authenticated using the system ID token1. Further users and even complete user groups can be identified and authenticated using further system IDs token2, token3, . . . etc. If a user or user group is identified using the input user ID and this identity is authenticated, the system ID token1, token2, token3, etc. at least is transferred as a so-called access identifier 30 for authorization purposes from the login area to the protected area, for example in the form of a binary number string.

In the present example of the inventive method the system ID token1 is transferred together with the input user ID "name1" as the access identifier 30. The input user ID "name1" is thereby included in the access identifier 30 as plain text, whereas the system ID token1 itself is not present as plain text in the access identifier 30. Thus the access identifier can be divided into a public part, which comprises the user ID NAME, and a secret part, which comprises the system ID MD5 (NAME,PW). Authorization of the already identified and authenticated user then takes place in the protected area using the transferred access identifier 30 and the system ID token1 contained therein. For example the system ID token1 transferred in the access identifier 30, which corresponds to an authenticated identity of the user with the user ID "name1" and the password "pw1", is thereby compared with the assignment of system IDs and protected data stored in a database 40. If there is a corresponding permitted assignment present in the database 40 for this system ID token1, the user or user group obtains corresponding access to the corresponding protected data, in the present example designated as Function A, in the protected area. In particular different access entitlements can thereby be defined in the database 40 for different system IDs. Thus it is established in the present example that a user with the user ID "name1" and the password "pw1" obtains access to the protected data designated as Function A and a user with the user ID "name2" and the password "pw2" obtains access to the protected data designated as Function B. Also a user group with the user ID "nameG" and the password "pwG" obtains access to the protected data designated as Function C. It is therefore possible with these and further combinations of user IDs and passwords to identify, authenticate and authorize users in the simplest manner without major administrative outlay and thereby allow them access to protected data.

Preferably at least authorized access to the protected data can also be logged in an access log 50 using the user names contained in the access identifier 30. For this the user ID NAME present as plain text is extracted from each of the transferred access identifiers 30 and logged together with the authorized access entitlement and where necessary a time stamp in said access log 50. In this way it is also possible to monitor as least authorized access taking place to protected data.

In particular in respect of the data to be protected in an automation system, the inventive method allows a low level of outlay with regard to user data administration. Generally the data present at one or a plurality of the control systems of the automation system is retrieved via different maintenance PCs. Since according to the invention there is no complex administration on the login side in the form of user management databases, in particular the project planning for the automation system can be simplified, as such a user management database does not have to be planned for every individual maintenance computer.

The invention claimed is:

1. A method for identifying, authenticating and authorizing a user of protected data, comprising:
   - identifying the user by a user ID entered by the user in an input field in a login area comprising a first hardware module;
   - combining the entered user ID with a password entered by the user;
   - mapping the combined user ID and the password to a system ID authenticating the user by a one-way encryption function;
   - transferring said system ID from the login area to a protected area, comprising a second hardware module, by using an access identifier;
   - authorizing the user to obtain access to protected data in the protected area by the access identifier,
   - wherein in addition to the system ID the user ID entered by the user is transferred in plain text in the access identifier,
   - wherein all authorized access to protected data is logged together with the transferred user ID in an access log, and
   - wherein access to protected data is authorized by comparing the system ID transferred with the access identifier with access entitlements for protected data in a database, wherein each access entitlement is stored in the database and comprises at least a system ID and a reference to data protected by the access entitlement.

2. The method according to claim 1, wherein the user is a user of protected data in an automation system.

3. A method for identifying, authenticating and authorizing a user of protected data, comprising:
   - identifying the user by a user ID input by them in an input field in a login area comprising a first hardware module, wherein
   - this input user ID is combined with a password input by the user and transferred with a one-way encryption function to a system ID, which authenticates the user, wherein
   - at least this system ID is transferred in an access identifier from the login area to a protected area, comprising a second hardware module,
   - wherein the user is authorized by this transferred access identifier to obtain access to protected data in the protected area,
   - wherein in addition to the system ID the user ID entered by the user is transferred in plain text in the access identifier,
   - wherein all authorized access to protected data is logged together with the transferred user ID in an access log, and
   - wherein access to protected data is authorized by comparing the system ID transferred with the access identifier with access entitlements for protected data in a database, wherein each access entitlement is stored in the database and comprises at least a system ID and a reference to data protected by the access entitlement, and wherein the user is a user of protected data in an automation system.

* * * * *